United States Patent
Teli et al.

(10) Patent No.: US 9,354,907 B1
(45) Date of Patent: May 31, 2016

(54) OPTIMIZED RESTORE OF VIRTUAL MACHINE AND VIRTUAL DISK DATA

(71) Applicant: Symantec Corporation, Mountain View, CA (US)

(72) Inventors: Ravindra V. Teli, Pune (IN); Mohammed Eliyas N. A. Shaikh, Pune (IN); Chirag Dalal, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 596 days.

(21) Appl. No.: 13/661,258

(22) Filed: Oct. 26, 2012

(51) Int. Cl.
 *G06F 12/00* (2006.01)
 *G06F 9/455* (2006.01)
 *G06F 12/10* (2016.01)

(52) U.S. Cl.
 CPC .......... *G06F 9/45533* (2013.01); *G06F 12/109* (2013.01); *G06F 12/1036* (2013.01)

(58) Field of Classification Search
 CPC   G06F 9/45533; G06F 12/109; G06F 12/1036
 See application file for complete search history.

(56) References Cited

U.S. PATENT DOCUMENTS

| | | | |
|---|---|---|---|
| 6,912,631 B1 | 6/2005 | Kekre et al. | |
| 6,931,558 B1 | 8/2005 | Jeffe et al. | |
| 7,024,527 B1 | 4/2006 | Ohr | |
| 7,093,086 B1 | 8/2006 | van Rietschote | |
| 7,194,487 B1 | 3/2007 | Kekre et al. | |
| 7,293,146 B1 | 11/2007 | Kekre et al. | |
| 7,356,679 B1 * | 4/2008 | Le et al. ........................... | 713/1 |
| 7,480,822 B1 | 1/2009 | Arbon et al. | |
| 7,552,358 B1 | 6/2009 | Asgar-Deen et al. | |
| 7,631,020 B1 | 12/2009 | Wei et al. | |
| 7,669,020 B1 | 2/2010 | Shah et al. | |
| 7,721,138 B1 | 5/2010 | Lyadvinsky et al. | |
| 7,797,281 B1 | 9/2010 | Greene et al. | |
| 7,805,631 B2 | 9/2010 | Fries | |
| 7,809,693 B2 | 10/2010 | Lango et al. | |
| 7,827,150 B1 | 11/2010 | Wu et al. | |
| 7,831,550 B1 | 11/2010 | Pande et al. | |
| 7,831,861 B1 | 11/2010 | Greene et al. | |

(Continued)

FOREIGN PATENT DOCUMENTS

EP   2234018 A1   9/2010

OTHER PUBLICATIONS

Makin, Gaurav and Nguyen, Sinh; Symantec Corporation, "Method to Reduce the RTO of an Application Directly from its Backup Image in a Virtualization Environment," Apr. 27, 2012, pp. 1-6.

(Continued)

*Primary Examiner* — Gurtej Bansal
(74) *Attorney, Agent, or Firm* — Campbell Stephenson LLP

(57) ABSTRACT

Various systems and methods for restoring a virtual machine and virtual machine data. For example, one method can involve receiving a request to restore the virtual machine and virtual machine data. The virtual machine data can include part or all of a virtual disk associated with the virtual machine. Both the virtual machine and the virtual machine data are stored in one or more backup storage devices. In response to the request, the virtual machine is restored from the backup storage device to a local storage device, and restoration of the virtual machine data is initiated. While the virtual machine data is being migrated from backup to local storage, I/O requests are received and processed. Processing the I/O request can involve performing the I/O requests to both the backup storage device and the local storage device.

22 Claims, 8 Drawing Sheets

(56) References Cited

U.S. PATENT DOCUMENTS

| | | | |
|---|---|---|---|
| 7,937,545 B1 | 5/2011 | Wu et al. | |
| 7,937,547 B2 | 5/2011 | Liu et al. | |
| 8,019,732 B2 | 9/2011 | Paterson-Jones et al. | |
| 8,046,550 B2 | 10/2011 | Feathergill | |
| 8,060,476 B1 | 11/2011 | Afonso et al. | |
| 8,099,391 B1 | 1/2012 | Monckton | |
| 8,117,168 B1 | 2/2012 | Stringham | |
| 8,135,748 B2 | 3/2012 | Rosikiewicz et al. | |
| 8,140,906 B1 | 3/2012 | Searls et al. | |
| 8,161,321 B2 | 4/2012 | Zheng et al. | |
| 8,185,505 B1 | 5/2012 | Blitzer et al. | |
| 8,209,290 B1 | 6/2012 | Dowers, II et al. | |
| 8,209,680 B1 | 6/2012 | Le et al. | |
| 8,219,769 B1 | 7/2012 | Wilk | |
| 8,230,187 B1 | 7/2012 | Krinke, II et al. | |
| 8,239,646 B2 | 8/2012 | Colbert et al. | |
| 8,290,912 B1 | 10/2012 | Searls et al. | |
| 8,307,177 B2 | 11/2012 | Prahlad et al. | |
| 8,315,983 B1 | 11/2012 | Sumant et al. | |
| 8,315,986 B1 | 11/2012 | Kapoor et al. | |
| 8,332,689 B2 | 12/2012 | Timashev et al. | |
| 8,346,726 B2 | 1/2013 | Liu et al. | |
| 8,346,727 B1 | 1/2013 | Chester et al. | |
| 8,346,891 B2 | 1/2013 | Safari et al. | |
| 8,355,407 B2 | 1/2013 | Wookey et al. | |
| 8,386,733 B1 | 2/2013 | Tsaur et al. | |
| 8,402,309 B2 | 3/2013 | Timashev et al. | |
| 8,438,349 B2 | 5/2013 | Olson et al. | |
| 8,443,166 B2 | 5/2013 | Czezatke et al. | |
| 8,464,254 B1 | 6/2013 | Vohra et al. | |
| 8,473,463 B1 | 6/2013 | Wilk | |
| 8,489,552 B1 | 7/2013 | Dowers, II et al. | |
| 8,489,830 B2 | 7/2013 | Wu et al. | |
| 8,510,271 B1 | 8/2013 | Tsaur et al. | |
| 8,527,990 B1 | 9/2013 | Marathe et al. | |
| 8,555,009 B1 | 10/2013 | Majahan et al. | |
| 8,565,545 B1 | 10/2013 | Syed et al. | |
| 8,566,640 B2 | 10/2013 | Timashev et al. | |
| 2003/0149845 A1* | 8/2003 | Fu | 711/144 |
| 2005/0210322 A1* | 9/2005 | Corrado | 714/13 |
| 2007/0043860 A1 | 2/2007 | Pabari | |
| 2008/0243953 A1 | 10/2008 | Wu et al. | |
| 2008/0276040 A1* | 11/2008 | Moritoki | 711/113 |
| 2009/0249284 A1 | 10/2009 | Antosz et al. | |
| 2009/0313447 A1 | 12/2009 | Nguyen et al. | |
| 2010/0058106 A1 | 3/2010 | Srinivasan et al. | |
| 2010/0077137 A1 | 3/2010 | Soemo et al. | |
| 2010/0107158 A1 | 4/2010 | Chen et al. | |
| 2010/0115332 A1 | 5/2010 | Zheng et al. | |
| 2010/0169592 A1 | 7/2010 | Atluri et al. | |
| 2010/0262586 A1 | 10/2010 | Rosikiewicz et al. | |
| 2010/0268568 A1 | 10/2010 | Ochs et al. | |
| 2011/0119462 A1 | 5/2011 | Leach et al. | |
| 2011/0173405 A1 | 7/2011 | Grabarnik et al. | |
| 2011/0276539 A1 | 11/2011 | Thiam | |
| 2012/0017114 A1* | 1/2012 | Timashev et al. | 714/15 |
| 2012/0109897 A1 | 5/2012 | Janakiraman et al. | |
| 2012/0110252 A1* | 5/2012 | McKean | 711/103 |
| 2012/0151273 A1 | 6/2012 | Ben Or et al. | |
| 2014/0067763 A1 | 3/2014 | Jorapurkar et al. | |

OTHER PUBLICATIONS

"Symantec Declares Deduplication Everywhere" Press Release, Symantec.com, Jul. 7, 2009, 5 pages.

Symantec "How to configure and use Exchange Granular Restore in NetBackup 6.5.3 and Later," Article ID: TECH66342 | Created: Jan. 29, 2008 | Updated: Jan. 12, 2010, 5 pages.

Simpson, Dave, "PHD Virtual Improves VM Backups"; Infostor, Jun. 1, 2009, vol. 13, No. 6, 2 pages.

PR Newswire "Arkela Delivers New vStorage-based Backup Agent for VMWare", Jun. 30, 2010, 3 pages.

M2 PressWIRE "CA Inc: CA Delivers Comprehensive Recovery Management to Support Data Storage, Backup and Recovery; New Releases of CA ARCserve Backupa nd CA XOsoft Leverage Virtualization, Data Deduplication, Storage Resource Management and DR Testing to Support Lean IT", Apr. 27, 2009, 5 pages.

Komiega, Kevin, "Symantec to Expand Deduplication", Infostor, Aug. 1, 2009, vol. 13, No. 8, 2 pages.

Symantec "Customer FAQ—Symantec Backup Exec 12.5 for Windows Servers and Symantec Backup Exec System Recovery 8.5", Aug. 2008, 12 pages.

Fegreus, Jack, "Analysis: Minimizing System Risk via End-to-End Backup and Recovery Process Automation", openBench Labs, Sep. 10, 2009, 24 pages.

Davies, Alex, "NetBackup Disk Based Data Protection Options" White Paper: Technical, Oct. 2007, 26 pages.

Hewlett-Packard "Complete Data Protection for VMWare Virtual Environments", ESG Research Report, ESG IT Infrastructure and Service Management Survey, Mar. 2008, 32 pages.

Symantec "Symantec NetBackup for VMWare Administrator's Guide, Unix, Windows, and Linux, Release 7.0.1", 2010, 118 pages.

Symantec "Symantec NetBackup Administrator's Guide, vol. 1, Unix and Linux, Release 7.0.1", 2010, vol. 1, 911 pages.

VMWare, Inc., "File Level Restore, VMWare Data Recovery 1.0", 2009, 3 pages.

VMWare, Inc., "Administration Guide, Site Recovery Manager 1.0 Update 1", 2008, 96 pages.

VMWare, Inc., "vSphere Web Servers SDK Programming Guide, vSphere Web Services SDK 4.0", 2009, 182 pages.

VMWare, Inc., "vSphere Basic System Administration, vCenter Server 4.0, ESX 4.0, ESXi 4.0", Copyright 2009-2011, 364 pages.

VMWare "Optimized Backup and Recovery for VMware Infrastructure with EMC Avamar", White Paper, Copyright 2007, 11 pages.

Symnatec "Symantec NetBackup PureDisk Getting Started Guide, Windows, Linus, and UNIX Release 6.6, Publication Release 6.6, revision 2", Copyright 2009, 111 pages.

Subash Rajaa et al.; Systems and Methods for Managing Multipathing Configurations for Virtual Machines; U.S. Appl. No. 13/548,195, filed Jul. 12, 2012.

Atul Akolkar et al.; Systems and Methods for Enhancing Virtual Machine Backup Image Data; U.S. Appl. No. 12/950,972, filed Nov. 19, 2010.

Deb Banerjee; Systems and Methods for Workload Security in Virtual Data Centers; U.S. Appl. No. 13/291,716, filed Nov. 8, 2011.

Subash Rajaa et al.; Systems and Methods for Facilitating Substantially Continuous Availability of Multi-Tier Applications Within Computer Clusters; U.S. Appl. No. 13/524,367, filed Jun. 15, 2012.

Justin Paul,"Veeam vPower Instant Recovery," Justin's ITBlog, Mar. 24, 2011, 4 pages http://jpaul.me/?p=1425.

Gaurav Makin and Sinh Nguyen, "Method to Reduce the RTO of an Application by Running the Application Directly from its Backup Image in a Virtualization Environment," Symantec, Apr. 27, 2012 (5 pages), http://ip.com/IPCOM/000217035.

"Veeam Backup & Replication: What's New in v6," Veeam (Nov. 18, 2011), 7 pages <http://www.vmc-company.ru/pdf/veeam/veeam_backup_6_0_whats_new.pdf>.

"Veeam Backup & Replication 5.0: User Guide," Veeam (Oct. 2010) 170 pages http://www.veeam.com/files/guide/veeam_backup_5_0_user_guide.pdf.

Henk Arts, "Veeam Backup and Replication v5," Veeam (Nov. 1, 2010), [Video] http://www.slideshare.net/henkarts/veeam-backup-and-replication-v5 , transcript attached 6 pages.

Anton Gostev, "Migration (VMware: [FAQ] Frequently Asked Questions)," Veeam Community Forums (Nov. 2011), 14 pages http://forums.veeam.com/viewtopic.php?f=24&t=9329#p39955.

Doug Hazelman, "vPower DEMO: Instant VM Recovery, U-AIR, Instant File-Level Restore," (Jan. 28, 2011), [Video] http://www.youtube.com/watch?v=zbZMsk2Prgw, Transcript 2 pages.

Veeam Backup & Replication v5 Preview—SureBackup, U-AIR and Instant VM Recovery (Aug. 15, 2010) 19 pages http://www.veeam.com/blog/veeam-backup-replication-v5-preview-surebackup-u-air-and-instant-vm-recovery.html.

* cited by examiner

OPTIMIZED RESTORE OF VIRTUAL MACHINE AND VIRTUAL DISK DATA

FIELD OF THE INVENTION

This invention relates to restoring computer data and, more particularly, to restoring virtual machines and virtual machine data.

DESCRIPTION OF THE RELATED ART

As modern computers become more powerful, the use of hardware and software virtualization to implement virtual machines is becoming more common. Virtual machines are software implementations of a physical computer that execute computer instructions in the manner of physical computer hardware. Virtual machines are often assigned one or more virtual disks. A virtual disk is a storage object formed directly or indirectly from memory of one or more underlying physical storage devices. A virtual disk is interpreted by a virtual machine as a physical storage device, e.g., hard disk. A virtual machine can write to and read from virtual disks assigned to the virtual machine.

Virtual machines and virtual disks can be backed up to provide data protection. For example, if a computer that hosts a virtual machine crashes, the virtual machine can be restored from a backup of the virtual machine to another computer. Similarly, a virtual disk that has been backed up can be restored from a backup of the virtual disk.

Restoring a virtual machine and virtual disk involves copying the virtual machine and virtual disk data from backup storage to another storage location. This can be a time consuming process and typically the virtual machine is prevented from operating normally until the restore is complete. This can result in performance degradation, such as delays in performing read and write operations, while the virtual machine and virtual disk are being restored.

BRIEF DESCRIPTION OF THE DRAWINGS

The present invention may be better understood, and its numerous objects, features and advantages made apparent to those skilled in the art by referencing the accompanying drawings.

Figure 1:
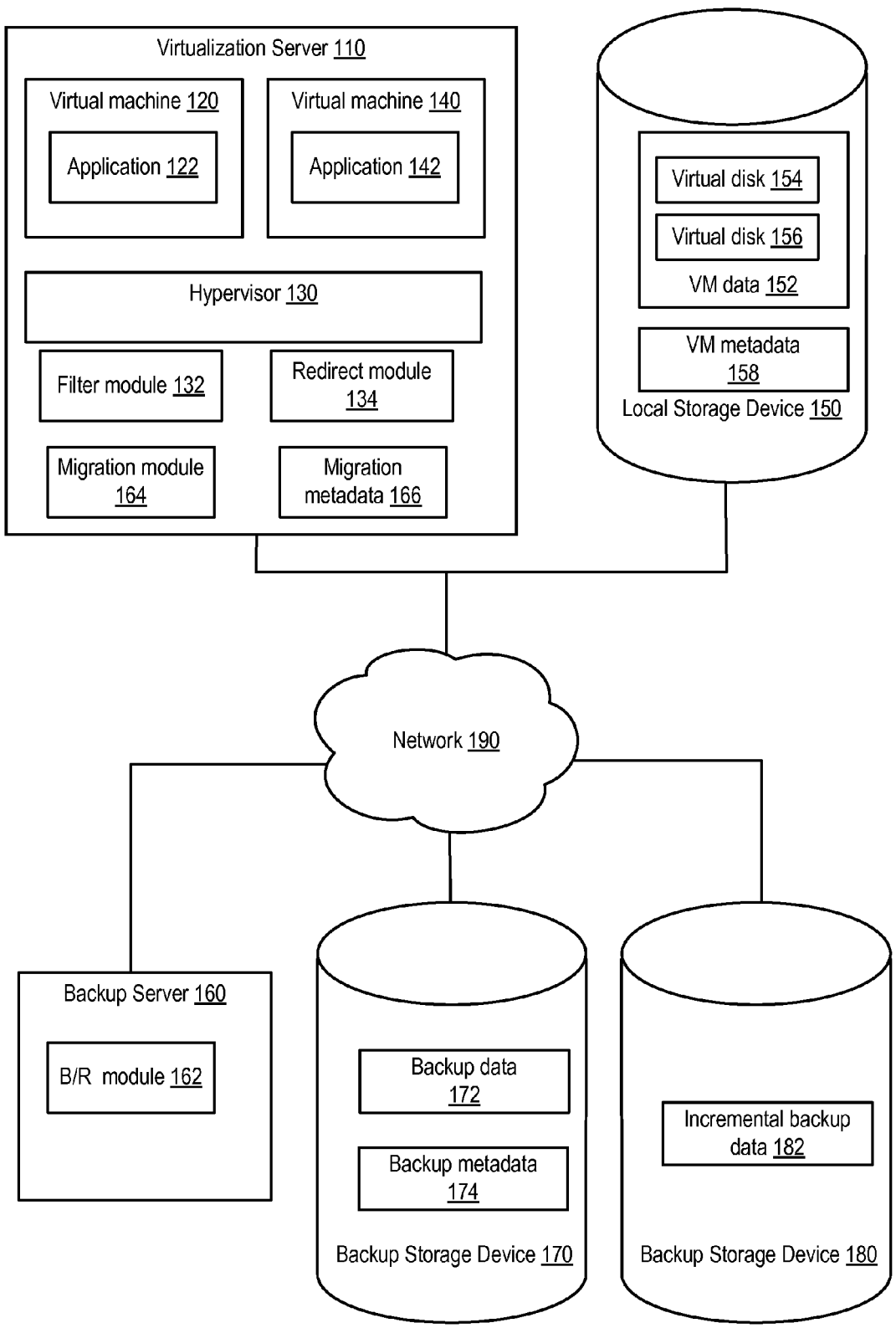
FIG. 1 is a block diagram of a system configured to restore virtual machines and virtual disks, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A virtual machine and virtual machine data associated with the virtual machine (often organized as a virtual disk) can be backed up to provide data protection for the virtual machine and virtual disk. The backed-up virtual machine and virtual disk can be restored to resume or begin virtual machine operations. For example, in a disaster recovery scenario, a virtual machine that has been inoperable due to a crash of the node hosting the virtual machine can be restored from backup to another host and operations can be resumed. In another embodiment, a virtual machine and virtual disk can be restored from backup to a host and operations can begin, thus creating multiple instances of the same virtual machine. Restoring the virtual machine can typically be performed relatively quickly as the virtual machine itself includes a relatively small amount of data (e.g., on the order of kilobytes or megabytes). Restoring the virtual disk typically takes longer as the virtual disk typically includes a relatively large amount of data (e.g., on the order of gigabytes).

There are several methods of restoring a virtual machine and virtual disk from backup storage to a local storage device. In one method, the virtual machine and virtual disk are copied from the backup to the local storage and once the copying is complete, the virtual machine is booted and begins operating. However, this method requires waiting until all data associated with the virtual machine and virtual disk have been copied before the virtual machine begins operation. If the virtual machine began operation before the copying was complete, the virtual machine might try to read a block from the virtual disk that had not been copied yet, resulting in erroneous data. Another potential problem would arise if the virtual machine wrote a block to the local storage that had not yet been restored. Subsequent restoration of the block from the backup would overwrite the block, thus causing data corruption.

To avoid having to wait until the entire virtual machine and virtual disk are copied from the backup, one method involves restoring the virtual machine to local storage and then pointing the virtual machine's input/output (I/O) operations to the virtual disk in the backup storage. In this method, the virtual disk can be copied from backup storage to local storage in a background copy process while the virtual machine directs I/O operations to the virtual disk in the backup storage. However, this method is also problematic in that writing and reading from the backup storage is likely to take significantly longer than writing and reading to local storage. This can cause unacceptable performance degradation. Furthermore, this method is inefficient because the virtual machine writes data to the virtual disk in the backup, and then the data is restored from the virtual disk in the backup to the virtual disk in the local storage, thus resulting in two writes. Such unnecessary duplication of I/O operations can also negatively impact performance.

FIG. 1 is a block diagram of a system configured to perform I/O operations from a virtual machine to a virtual disk while the virtual disk is being restored. As shown, the system includes a virtualization server 110 coupled to a local storage device 150. Also shown are a backup server 160, a backup storage device 170, and a backup storage device 180. The components are communicatively coupled via a network 190. Network 190 can include a WAN (Wide Area Network) such as the Internet, one or more LANs (Local Area Networks), and/or one or more SANs (Storage Area Networks).

Backup server 160 is configured to perform backup and restore operations. Backup server 160 is a computing device such as a personal computer, laptop computer, server, personal digital assistant, cell phone, or the like. As shown, backup server 160 includes a backup and restore (B/R) module 162. B/R module 162 is configured to perform full and incremental backup operations. For example, B/R module 162 can create a full, or base, backup image of a virtual machine 120 and virtual disk 154 and store the backup image in backup data 172. B/R module 162 is also configured to perform incremental backup operations. For example, B/R module 162 can create an incremental backup image of virtual machine 120 and virtual disk 154, capturing only those changes that have occurred since the last full backup operation, and store the resulting incremental backup images in incremental backup data 182. B/R module 162 also updates backup metadata 174. Backup metadata 174 includes information such as what backup images are included in backup data 172 and incremental backup data 182, and when the backup images were created. B/R module 162 is also configured to perform restore operations. For example, B/R module 162 is configured to restore a virtual machine from backup data 172 to virtualization server 110.

Backup storage devices are storage devices that store backup data, such as one or more full and/or incremental backup images. Backup storage device 170 and backup storage device 180 can each be, for example, a solid state drive (SSD), a hard disk, a compact disc (CD), a digital versatile disc (DVD), or other mass storage device, or a storage system (e.g., a redundant array of independent disks (RAID) system or an optical storage jukebox) that includes an array of such storage devices. Backup storage device 170 and backup storage device 180 can also each be a virtual or logical storage device that is implemented on such physical storage devices and/or storage systems. For example, backup storage 170 and backup storage device 180 can each be a logical volume that is implemented on a RAID storage system. Additionally, backup storage device 170 and backup storage device 180 can include one or more storage devices. Backup storage device 170 and backup storage device 180 can also each include one or more types of storage media, including solid state media (e.g., flash drives), optical media (e.g., CDs and DVDs), and magnetic media (e.g., hard disks or magnetic tape). In some embodiments, backup storage device 170 and backup storage device 180 can be implemented using cloud storage, in which the storage device is a logical storage device to which physical storage device(s) are allocated on an as-needed and/or as-contracted basis.

Virtualization server 110 executes a hypervisor application 130, which is configured to support virtualization operations, such as the implementation and management of virtual machines. Virtualization server 110 is a computing device such as a personal computer, laptop computer, server, personal digital assistant, cell phone, or the like. As shown, virtual machine 120 and virtual machine 140 are implemented on virtualization server 110. While two virtual machines are shown in FIG. 1, it should be understood that virtualization server can implement more or fewer virtual machines.

Virtual machine 120 and virtual machine 140 are configured to access virtual machine data 152. Virtual machine data 152 includes virtual machine disk 154 and virtual machine disk 156. Virtual machine disks store data for one or more virtual machines. Each virtual disk is assigned to a virtual machine by hypervisor 130. Hypervisor 130 can grant virtual machines exclusive or shared access to virtual disks. When hypervisor 130 grants exclusive access over a virtual disk to a given virtual machine, other virtual machines are not allowed to read or write to the virtual disk. In the case of shared access, hypervisor 130 allows multiple virtual machines to access to (e.g., read or write access) the virtual disk.

As shown, local storage device 150 is a discrete storage device directly coupled to virtualization server 110. However, in other implementations, local storage device 150 can be included within a group of virtualized storage devices or can be indirectly connected to virtualization server 110 via a network, such as network 190. In various embodiments, local storage device 150 can be, for example, a solid state drive (SSD), a hard disk, a compact disc (CD), a digital versatile disc (DVD), or other mass storage device, or a storage system (e.g., a redundant array of independent disks (RAID) system or an optical storage jukebox) that includes an array of such storage devices. Local storage 150 can also be a virtual or logical storage device that is implemented on such physical storage devices and/or storage systems. For example, local storage 150 can be a logical volume that is implemented on a RAID storage system. Additionally, local storage 150 can include one or more storage devices. Local storage 150 can also include one or more types of storage media, including solid state media (e.g., flash drives), optical media (e.g., CDs and DVDs), and magnetic media (e.g., hard disks or magnetic tape). In some embodiments, local storage 150 can be implemented using cloud storage, in which the storage device is a logical storage device to which physical storage device(s) are allocated on an as-needed and/or as-contracted basis.

As shown, local storage device 150 also includes virtual machine metadata 158. Virtual machine metadata 158 includes information regarding the configuration of the virtual machines 120 and 140, as well as information identifying which blocks in the virtual disks are allocated to each virtual machine. For purposes of this description, a block is allocated to a virtual machine if data has been written to the block for use by the virtual machine, if the block has been reserved for use by the virtual machine, and/or if a default value is written to the block to indicate that the block is not a "free" block. Virtual machine metadata 158 can also include status information (not shown) regarding the virtual machines 120 and 140.

Virtual machine 120 includes application 122 and virtual machine 140 includes application 142. Application 122 and application 142 can each be a word processing program, email program, graphic editing program, database application, or the like and can generate and transmit one or more I/O requests to read, write, delete, or otherwise modify data stored in virtual machine data 152.

As noted briefly above, virtualization server 110 also includes a hypervisor 130. Hypervisor 130 supports one or more virtual machines, such as virtual machine 120 and virtual machine 140. Hypervisor 130 configures the virtual machines as well as the storage associated with the virtual machines. This can involve allocating and/or configuring server resources (e.g., processor cycles and bandwidth), storage resources, failover protection, backup policies, and the like for each virtual machine. Hypervisor 130 is also configured to monitor the health of each virtual machine and detect and resolve any conflicts between the virtual machines and any other processes implemented using virtualization server 110.

In one embodiment, hypervisor 130 receives configuration information, such as a set of desired specifications, for each virtual machine from a user, e.g., an administrator. Based on the specifications, hypervisor 130 configures each virtual machine. Configuring a virtual machine involves assigning and/or reserving resources for the virtual machine to use. For example, if virtualization server 110 includes multiple processors (not shown), hypervisor 130 can reserve a particular processor or processors, or schedule a specified amount of processing time for a virtual machine. Hypervisor 130 can also create a virtual disk having a specified size, speed, and/or reliability characteristics, such as virtual disk 154 or virtual disk 156, and assign the virtual disk to the virtual machine.

Hypervisor 130 stores the virtual machine configuration information in virtual machine metadata 158. Such configuration information can be stored as a file, such as an extensible markup language (xml) file, a collection of files, a database, or any other such data storage object.

Hypervisor 130 is also configured to monitor and detect the status of each virtual machine. That is, hypervisor 130 can detect whether each virtual machine is, for example, active, disabled, busy, idle, failed, and the like. Hypervisor 130 can update virtual machine metadata 158 to indicate the status of the virtual machine.

Hypervisor 130 is configured to monitor I/O requests, such as reads and writes, from a virtual machine and perform the I/O requests using the virtual disk associated with the virtual machine. For example, virtual machine 120 can generate a write request that specifies a target block in virtual disk 154. The write request will also specify a data value that is to be written to the target block. In one embodiment, virtual disk 154 is implemented as a sparse file and hypervisor 130 allocates additional space in virtual disk 130 in response to the write request and then writes the data to the allocated space. Alternatively, the write request can specify a block that has already been allocated within the sparse file (also referred to as an existing target block herein). In response to detecting the I/O request, hypervisor 130 writes the data to the target block, overwriting any data that may have been stored in the target block at the time that virtual machine 120 requested the write. In another example, virtual machine 120 can generate a read request that specifies a target block in virtual disk 154 and transmit the read request to hypervisor 130. In response to receiving the read request, hypervisor 130 locates the target block specified in the read request, reads the data stored in the target block, and returns the data to virtual machine 120.

Virtualization server 110 also includes a filter module 132 and a redirect module 134, which are used to perform I/O requests while a virtual machine and virtual disk are being restored. Filter module 132 is configured to detect and capture I/O requests from each virtual machine if those requested target blocks that have not yet been restored to local storage as part of an ongoing restore operation. Redirect module 134 is configured to redirect the I/O requests captured by filter module 132 to a backup copy of the virtual disk associated with the virtual machine. For example, redirect module 134 can redirect an I/O request to read or write a target block in virtual disk 154 to a backup copy of virtual disk in backup data 172 in response to detecting that the target block has not yet been restored to local storage device 150.

Sometimes a virtual machine becomes unavailable due to a failure of some sort. For example, a virtual machine can become unavailable due to the virtual machine crashing, the host on which the virtual machine resides crashing, a network connectivity failure, or the like. Subsequent to the virtual machine becoming unavailable, the virtual machine can be restored, e.g., to another host, such as virtualization server 110. This is a known as a disaster recovery scenario. In a non-disaster recovery scenario, a virtual machine can be restored from a backup, and some or all of the virtual machine's data restored as well, so that the virtual machine can perform a set of tasks, such as run a simulation. To restore a virtual machine, the backup server copies the virtual machine from the backup storage device to the local storage of the virtualization server on which the virtual machine is being restored.

In either disaster recovery or non-disaster recovery, once the virtual machine has been restored or copied to local storage device, the hypervisor boots the virtual machine to the virtualization server. Restoring the virtual machine can be done relatively quickly, as the virtual machine configuration information typically includes a relatively small amount of data. However, in order for the virtual machine to function properly, the virtual machine data, such as data stored in the virtual disk, should also be restored from the backup storage device to the local storage device. Restoring the virtual machine data can take longer and can be done by a migration module as part of a background copy operation.

Consider the case in which virtual machine 120 has been restored from backup data 172, and virtual disk 154 is being restored from backup data 172 by migration module 164. Rather than wait for the entirety of virtual disk 154 to be restored, the hypervisor can create virtual disk 154 as a sparse virtual disk file and assign the virtual disk file to virtual machine 120. When virtual machine 120 issues an I/O request, filter module 132 captures the I/O and decides whether the I/O request can be performed to the newly created virtual disk 154 or whether the I/O request is targeted to data stored in backup data 172. In the case of a write, the write can be performed from local storage, even if the restore operation has not yet moved data from the backup to the targeted location in the virtual disk. That is, the data can be written to virtual disk 154 regardless of how far the restore operation has proceeded. However, hypervisor 130 communicates to migration module 164 that the write is being performed so that migration module 164 does not subsequently overwrite the newly written data as part of the restore process. In one embodiment, hypervisor 130 updates virtual machine metadata 158 to indicate that the newly written block is allocated, e.g., that the block stores data that is in use by the virtual machine.

Virtualization server 110 also includes a migration module 164. Migration module 164 is configured to perform migration operations. In one embodiment, a migration operation involves copying data from backup data 172 to VM data 152. For example, migration module 164 can perform a background copy operation of data from backup data 172 and incremental backup data 182 to virtual disk 154, thus restoring virtual disk 154. Virtualization server 110 also includes migration metadata 166, which is configured to be used by migration module 164 to track the progress of migration operations. Migration module 164 can access virtual machine metadata 154 to detect that the block has been written before moving data to that block from the backup data; if the metadata indicates that the block contains valid data already, migration module 164 will not overwrite that data with data from the backup.

In the case of a read, hypervisor 130 checks if the target block has been restored yet. In one embodiment, hypervisor 130 accesses migration metadata 166 to detect whether migration metadata 166 indicates that the target block has already been copied to local storage from backup storage. If so, hypervisor 130 allows the read to complete normally, using data from the local storage device. If the target block has not yet been written as part of the restore process, redirect module 134 redirects the read to the backup storage device, reads the data from the backup storage device, and provides the data to the virtual machine, thus completing the I/O request. Again, hypervisor 130 updates virtual machine metadata 158 to indicate that the target block in the local storage device now contains data that is in use, so that migration module 166 does not overwrite the data with old data from the backup.

Figure 2:
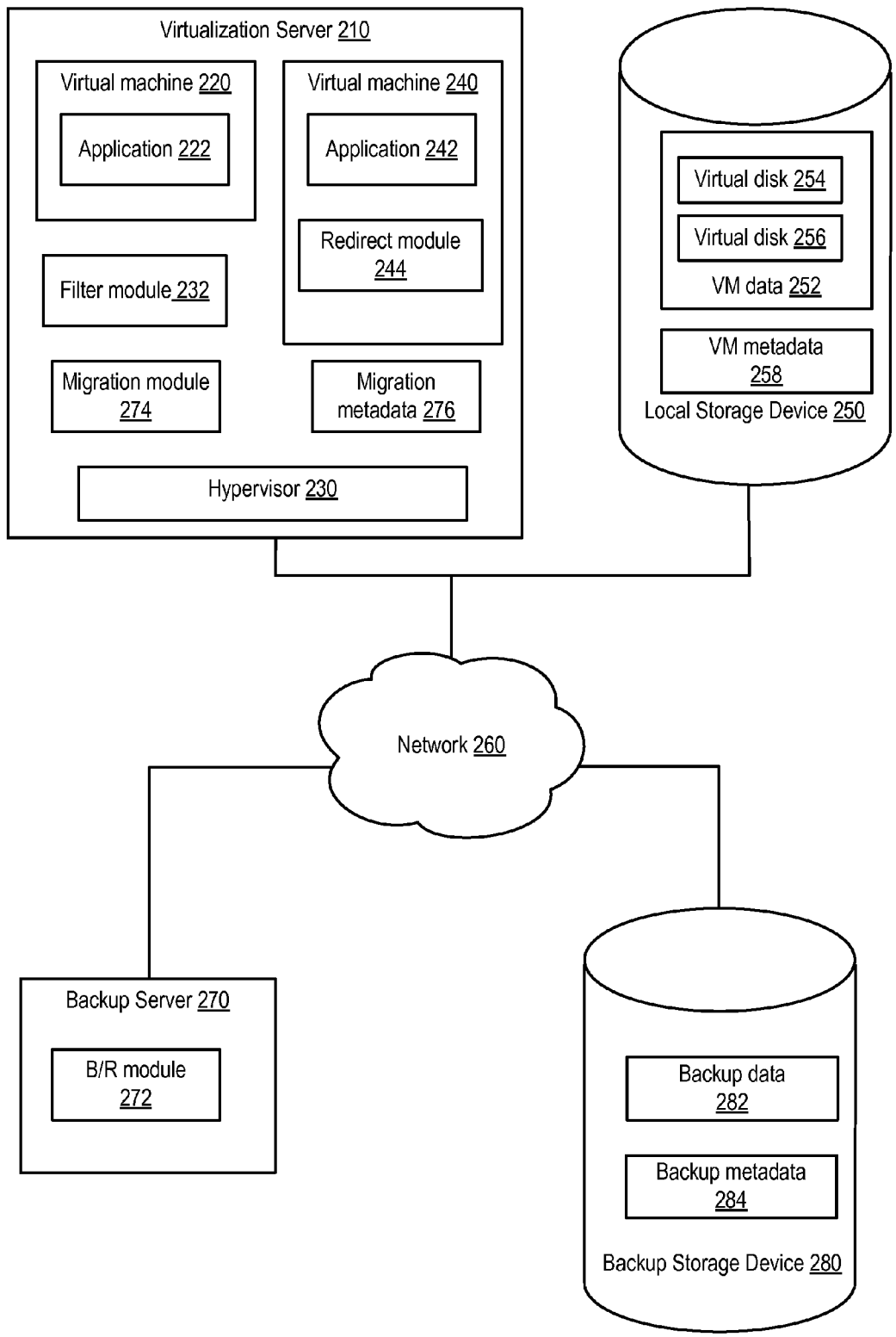
FIG. 2 is a block diagram of another system configured to restore virtual machines and virtual disks, according to one embodiment.

FIG. 2 is a block diagram of another system configured to perform I/O operations while restoring virtual machines and virtual disks, similar to the system shown in FIG. 1. One difference between FIG. 2 and FIG. 1 is that in the system of FIG. 2, hypervisor 230 is a smaller, less sophisticated hypervisor than hypervisor 130. Hypervisor 230 is not capable of providing all of the functionality that hypervisor 130 provides. Another difference is that, redirect module 244 is included in a separate virtual machine 240. Virtual machine 240 is configured to perform I/O redirect operations, using redirect module 244.

As shown, the system includes a virtualization server 210 coupled to a local storage device 250. Also shown are a backup server 270 and a backup storage device 280. The components are communicatively coupled via a network 260. Network 260 can include a WAN (Wide Area Network) such as the Internet, one or more LANs (Local Area Networks), and/or one or more SANs (Storage Area Networks).

Backup server 270 is configured to perform backup and restore operations. Backup server 270 is a computing device such as a personal computer, laptop computer, server, personal digital assistant, cell phone, or the like. As shown, backup server 270 includes a backup and restore (B/R) module 272. B/R module 272 performs full and incremental backup operations. For example, B/R module 272 can create a backup of a virtual machine 220 and virtual disk 254 and store the backup image in backup data 282. B/R module 262 also updates backup metadata 284. Backup metadata 284 includes information such as what backup images are included in backup data 282, and when the backup images were created. B/R module 272 is also configured to perform restore operations. For example, B/R module 272 is configured to restore a virtual machine from backup data 282 to virtualization server 210.

Backup storage device 280 can be, for example, a solid state drive (SSD), a hard disk, a compact disc (CD), a digital versatile disc (DVD), or other mass storage device, or a storage system (e.g., a redundant array of independent disks (RAID) system or an optical storage jukebox) that includes an array of such storage devices. Backup storage devices 280 can also be a virtual or logical storage device that is implemented on such physical storage devices and/or storage systems. For example, backup storage device 280 can be a logical volume that is implemented on a RAID storage system. Additionally, backup storage device 280 can include one or more storage devices. Backup storage device 280 can also include one or more types of storage media, including solid state media (e.g., flash drives), optical media (e.g., CDs and DVDs), and magnetic media (e.g., hard disks or magnetic tape). In some embodiments, backup storage device 280 can be implemented using cloud storage, in which the storage device is a logical storage device to which physical storage device(s) are allocated on an as-needed and/or as-contracted basis.

Virtualization server 210 executes a hypervisor application 230, which is configured to support virtualization operations, such as the implementation and management of virtual machines. Virtualization server 210 is a computing device such as a personal computer, laptop computer, server, personal digital assistant, cell phone, or the like. As shown, virtual machine 220 and virtual machine 240 are implemented on virtualization server 210. While two virtual machines are shown in FIG. 2, it should be understood that virtualization server can implement more or few virtual machines.

Virtual machine 220 and virtual machine 240 are configured to access virtual machine data 252. Virtual machine data 252 includes virtual machine disk 254 and virtual machine disk 256. Virtual machine disks store data for one or more virtual machines. Each virtual disk is assigned to a virtual machine by hypervisor 230. Hypervisor 230 can grant a virtual machine exclusive or shared access to the virtual disks.

As shown, local storage device 250 is directly coupled to virtualization server 210. However, in other implementations, local storage device 250 can be included within a group of virtualized storage devices or can be indirectly connected to virtualization server 210 via a network, such as network 260. In various embodiments, local storage device 250 can be, for example, a solid state drive (SSD), a hard disk, a compact disc (CD), a digital versatile disc (DVD), or other mass storage device, or a storage system (e.g., a redundant array of independent disks (RAID) system or an optical storage jukebox) that includes an array of such storage devices. Local storage 250 can also be a virtual or logical storage device that is implemented on such physical storage devices and/or storage systems. For example, local storage 250 can be a logical volume that is implemented on a RAID storage system. Additionally, local storage 250 can include one or more storage devices. Local storage 250 can also include one or more types of storage media, including solid state media (e.g., flash drives), optical media (e.g., CDs and DVDs), and magnetic media (e.g., hard disks or magnetic tape). In some embodiments, local storage 250 can be implemented using cloud storage, in which the storage device is a logical storage device to which physical storage device(s) are allocated on an as-needed and/or as-contracted basis.

Local storage device 250 also includes virtual machine metadata 258. Virtual machine metadata 258 includes information regarding the configuration of virtual machines 220 and 240, as well as information identifying which blocks in the virtual disks are allocated to each virtual machine. For purposes of this description, a block is allocated to a virtual machine if data has been written to the block for use by the virtual machine, if the block has been reserved for use by the virtual machine, and/or if a default value is written to the block to indicate that the block is not a "free" block. Virtual machine metadata 258 can also include status information (not shown) regarding virtual machines 220 and 240.

Virtual machine 220 includes application 222 and virtual machine 240 includes application 242. Application 222 and application 242 can each be a word processing program, email program, graphic editing program, database application, or the like and can generate and transmit one or more I/O requests to read, write, delete, or otherwise modify data stored in virtual machine data 252.

As noted briefly above, virtualization server 210 also includes a hypervisor 230. Hypervisor 230 supports one or more virtual machines, such as virtual machine 220 and virtual machine 240. Hypervisor 230 configures the virtual machines as well as the storage associated with the virtual machines. This can involve allocating server resources, such as processor cycles and bandwidth, storage resources, failover protection, backup policies, and the like for each virtual machine. Hypervisor 230 is also configured to monitor the health of each virtual machine and detect and resolve any conflicts between the virtual machines and any other processes implemented using virtualization server 210.

In one embodiment, hypervisor 230 receives configuration information, such as a set of desired specifications, for each virtual machine from a user, e.g., an administrator. Based on the specifications, hypervisor 230 configures each virtual machine. Configuring a virtual machine involves assigning and/or reserving resources for the virtual machine to use. For example, if virtualization server 210 includes multiple processors (not shown), hypervisor 230 can reserve a particular processor or processors, or schedule a specified amount of processing time for a virtual machine. Hypervisor 230 can also allocate a virtual disk having a specified size, speed, and/or reliability characteristics, such as virtual disk 254 or virtual disk 256.

Hypervisor 230 stores the virtual machine configuration information in virtual machine metadata 258. Such configuration information can be stored as a file, such as an extensible markup language (xml) file, a collection of files, a database, or any other such data storage object.

Hypervisor 230 is also configured to monitor and detect the status of each virtual machine. That is, hypervisor 230 can detect whether each virtual machine is, for example, active, disabled, busy, idle, failed, and the like. Hypervisor 230 can update virtual machine metadata 258 to indicate the status of the virtual machine.

Hypervisor 230 is configured to monitor I/O requests, such as reads and writes, from a virtual machine and perform the I/O requests using the virtual disk associated with the virtual machine. For example, virtual machine 220 can generate a write request that specifies a target block in virtual disk 254. The write request also specifies a data value that is to be written to the target block. In one embodiment, virtual disk 254 is implemented as a sparse file and hypervisor 230 allocates additional space in virtual disk 254 in response to the write request and then writes the data to the allocated space. Alternatively, the write request can specify block that has already been allocated within the sparse file (also referred to as an existing target block herein). Hypervisor 230 writes the data to the target block, overwriting any data that may have been stored in the target block at the time that virtual machine 220 requested the write. Another example, virtual machine 220 can generate a read request that specifies a target block and transmit the read request to hypervisor 230. In response to receiving the read request, hypervisor 230 locates the target block specified in the read request, reads the data stored in the target block, and returns the data to virtual machine 220.

Virtualization server 210 includes a filter module 232 and virtual machine 240 includes a redirect module 244, which are used to perform I/O requests while a virtual machine is being restored. Filter module 232 is configured to detect and capture I/O requests from each virtual machine 220 if those requested target blocks that have not yet been restored to local storage as part of an ongoing restore operation. Redirect module 244 is configured to redirect the I/O requests captured by filter module 232 to a backup copy of the virtual disk associated with the virtual machine in response to detecting that the target block has not yet been restored to local storage device 250. Filter module 232, while shown separately, can be implemented in hypervisor 230.

As discussed above, sometimes a virtual machine becomes unavailable due to a failure of some sort. The virtual machine and virtual disk can be restored from backup storage. Consider the case in which virtual machine 220 has been restored from backup data 282, and virtual disk 254 is being restored from backup data 282 by migration module 274. Migration module 274 is configured to perform migration operations. In one embodiment, a migration operation involves copying data from backup data 282 to VM data 252. For example, migration module 274 can perform a background copy operation of data from backup data 282 to virtual disk 254, thus restoring virtual disk 254. Virtualization server 210 also includes migration metadata 276, which is configured to be used by migration module 274 to track the progress of migration operations. Rather than wait for the entire virtual disk to be restored, hypervisor 230 can create virtual disk 254 as a sparse virtual disk file and assign the virtual disk to virtual machine 220. Migration module 274 and migration metadata 276, while shown separately, can be implemented in virtual machine 240.

When virtual machine 220 issues an I/O request, filter module 232 captures the I/O and decides whether the I/O request can be performed to the newly created virtual disk 254 or whether the I/O request uses data stored in backup data 282. In the case of a write, the write can be performed from local storage, even if the restore operation has not yet moved data from the backup to the targeted location in the virtual disk. However, hypervisor 230 communicates to migration module 274 that the write is being performed so that migration module 274 does not subsequently overwrite the newly written data as part of the restore process. To do so, hypervisor 230 updates virtual machine metadata 258 to indicate that the newly written block is allocated, e.g., that the block stores data that is in use by virtual machine 220. Migration module 274 can access virtual machine metadata 258 to detect that the block has been written before moving data to that block from the backup data; if the metadata indicates that the block contains valid data already, migration module 274 will not overwrite that data with data from the backup In the case of a read, hypervisor 230 checks if the target block has been restored yet. If so, hypervisor 230 allows the read to complete normally, using data from the local storage device. If the target block has not yet been written as part of the restore process, hypervisor 230 transmits the read request to redirect module 244 and redirect module 244 redirects the read to backup storage device 280, reads the data from backup storage device 280, and provides the data to virtual machine 220, thus completing the I/O request. Hypervisor 230 also writes the data to the local storage device. Again, hypervisor 230 updates virtual machine metadata 258 to indicate that the target block in the local storage device now contains data that is in use, so that migration module 274 does not overwrite the data with old data from the backup.

Figure 3:
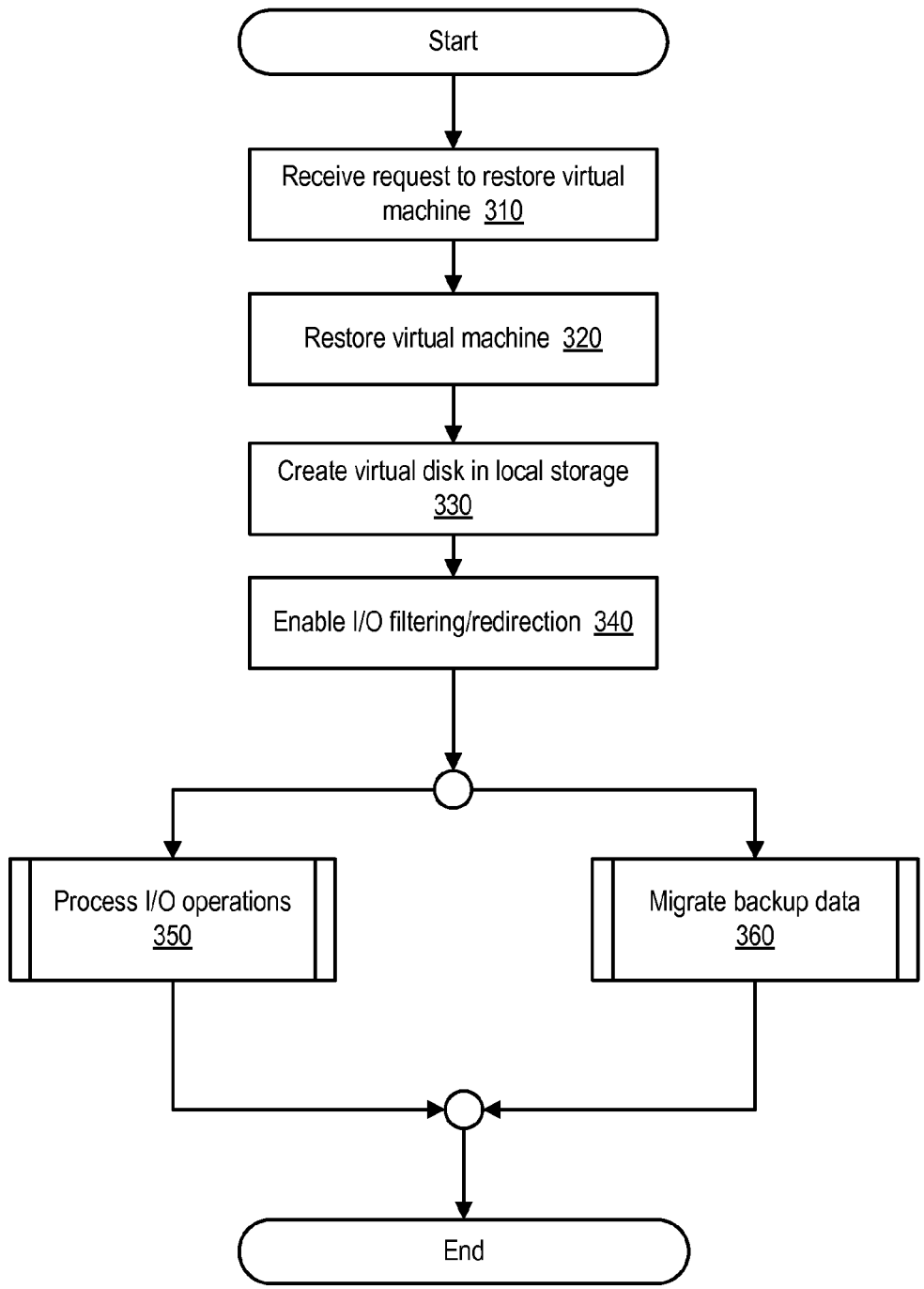
FIG. 3 is a flowchart of a method of restoring a virtual machine and virtual disk, according to one embodiment.

FIG. 3 is a flowchart of a method of performing I/O operations while restoring a virtual machine, such as virtual machine 120 of FIG. 1, and a virtual disk, such as virtual disk 154 of FIG. 1. The method can be performed by a virtualization server, such as virtualization server 110 of FIG. 1. The virtualization server communicates with a backup server, such as backup server 160 of FIG. 1, to restore the virtual machine and virtual disk from a backup storage device, such as backup storage device 170, to a local storage device, such as local storage device 150 of FIG. 1. In one embodiment, restoring the virtual machine and virtual disk involves copying data from one or more additional backup storage devices, such as backup storage device 180. For example, the method can include copying data from a full backup of a virtual disk from one backup storage device and data from one or more incremental backup images of the virtual disk, where the incremental backup images are stored on one or more separate backup storage devices.

The method begins at 310 with receipt of a request to restore virtual machine. For example, a backup server, such as backup server 160 of FIG. 1, can receive a request from an administrator via a backup and restore (B/R) module, such as B/R module 162 of FIG. 1. The request can be received in response to detecting a virtual machine has become unavailable, e.g., due to a node crash, network connectivity interruption, or some other disaster recovery scenario. Alternatively, the message can be received in response to detecting a need for an additional virtual machine to perform a specified task, such as a virtualization server being assigned to run a simulation. The request can be automatically generated by a virtualization server in response to detecting one of the conditions discussed above and received at the backup server from the virtualization server. In one embodiment, the restore request is generated by an administrator manually and received at the backup server from the administrator. The request specifies an identifier for a virtual machine and a virtual disk associated with the virtual machine. In one embodiment, the request specifies a set of data from a virtual disk, such as a file, or other logical set of data, or a range of blocks, or other physical collection of data.

At 320, the backup server restores the virtual machine from the backup storage device to a local storage device. In one embodiment, the B/R module locates a backup image of the virtual machine in the backup storage device. Locating the virtual machine can involve accessing a list of backup images and their locations. Such a list can be stored in backup metadata, such as backup metadata 174 of FIG. 1. Once the B/R module locates the backup image of the virtual machine, the B/R module creates a copy of the backup image and transmits the copy of the backup image to the local storage device. In one embodiment, the B/R module transmits the backup image directly to the virtualization server.

A hypervisor, such as hypervisor 130 of FIG. 1, detects that the virtual machine has been copied to the local storage device and boots the virtual machine on the virtualization server. In one embodiment, this involves setting the virtual machine status to active. Changing the virtual machine status can involve updating virtual machine metadata, such as virtual machine metadata 158 of FIG. 1. Once the virtual machine has been booted, one or more applications, such as application 122 of FIG. 1, can be executed by the virtual machine.

At 330, the hypervisor creates a new virtual disk in local storage, such as virtual disk 154. The virtual disk can be created as a sparse file. When a virtual disk\implemented as sparse file is created, the hypervisor does not actually copy any data to the virtual disk at the time the virtual disk is created, so the virtual disk can be created quickly and consumes relatively little (if any) storage space. Instead, the hypervisor updates metadata, such as a file system, to indicate that a virtual disk has been created. The hypervisor can specify a maximum amount of space that the virtual disk can grow to occupy.

At 340, the hypervisor enables I/O filtering and redirection. In response to I/O filtering and redirection being enabled, a filter module, such filter module 132 of FIG. 1, monitors the virtual machine for I/O requests, and any I/O requests received from the virtual machine can be redirected by a redirection module, such as redirect module 134 of FIG. 1. Subsequent to enabling I/O filtering and redirection, any received I/O operations are processed at 350, as described in greater detail with relation to FIG. 5.

Figure 4:
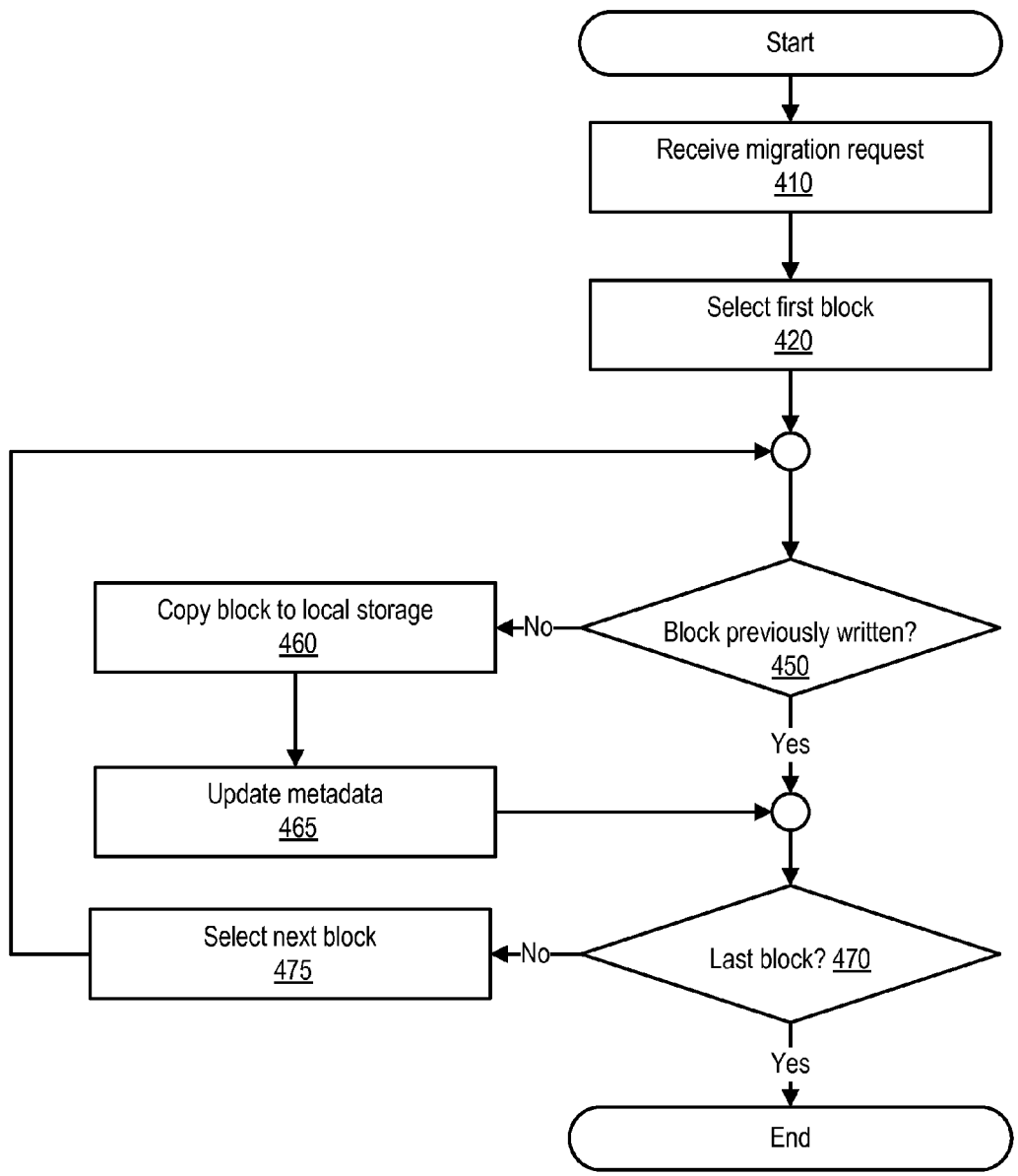
FIG. 4 is a flowchart showing additional details of restoring a virtual disk, according to one embodiment.

Concurrently with processing of the I/O operations, a migration data process is performed at 360 as discussed in greater detail with regard to FIG. 4. In one embodiment, the backup server initiates the migration process.

FIG. 4 is a method of migrating virtual disk data from a backup storage device, such as backup storage device 170 of FIG. 1, to a local storage device, such as local storage device 150 of FIG. 1. The method can be reformed by a backup server, such as backup server 160 of FIG. 1. In one embodiment, a migration module, such as migration module 164 of FIG. 1, performs a migration operation in the background that copies the data of one or more virtual disks from one or more full backup images and/or incremental backup images stored in one or more backup storage devices to a local storage device. The migration module can interact with a hypervisor to track which blocks of the backup images have been copied and still need to be copied.

The method begins at 410 with the backup server receiving the migration request. A user, such as a backup administrator, can specify that a virtual disk stored in a backup storage device, such as backup storage device 170 of FIG. 1, should be migrated to the local storage device. The migration request includes information that identifies the virtual disk that is to be restored. The backed up virtual disk can be stored in a single full backup image, or portions of the backed up virtual disk can be stored in a full backup image and one or more incremental backup images.

In response to receiving the request, the migration module detects the locations in the backup storage device(s) that store the virtual disk's data. For example, the migration module can access a list of blocks or extents in the backup storage device that are associated with the virtual disk. In one embodiment, the virtual disk that is to be restored is stored in one full backup image and multiple incremental backup images. The full backup image and multiple incremental backup images are stored on separate data stores, which are not communicatively coupled. The hypervisor creates a list of all data blocks across the separate data stores. The hypervisor can combine several lists of blocks associated with a given virtual disk from several different sources, e.g., backup servers.

At 420, the migration module selects a first block of the virtual disk that is being restored. In one embodiment, the migration module performs an in-order traversal and selects the block that is closest to the beginning of the backup storage device or the block that is closest to the beginning of the backup image.

At 450, the migration module detects whether the block has previously been restored. If so, the method proceeds to 470 without restoring the block. In one embodiment, the migration module accesses migration metadata, such as migration metadata 166 of FIG. 1. The migration metadata can be implemented as a bitmap, a list of blocks, or any other structure that can be used to identify which blocks of a given virtual disk have been restored and which blocks have not yet been restored. In one embodiment, a hypervisor can cause the migration metadata to indicate that a given block has been restored in response to receiving and processing an I/O operation which includes the given block as the target of the I/O operation. For example, if the hypervisor receives a write request for a particular block, the hypervisor can perform the write operation, which involves writing data to the particular block in the local storage device, and can also update the migration metadata to indicate that the block has already been restored. This prevents the migration module from restoring the block and overwriting the data that the hypervisor wrote to the block in the local storage device.

If the migration metadata indicates that the block has not yet been restored to local storage, the migration module copies the block to local storage at 460. In response to the block being copied to local storage, the hypervisor updates metadata, such as metadata 158 of FIG. 1, to indicate that the block is allocated, e.g., stored valid data.

At 465, the migration module updates the migration metadata to indicate that the block has been restored. In one embodiment, this involves dirtying a bit in a bitmap or adding an identifier for the block to a list of blocks that have been restored.

At 470, the migration module detects whether the selected block is the last block in the virtual disk that is being restored. If not, the migration module selects the next block at 475, and the method returns to 430. If the last block of the virtual disk has been restored, the migration module can notify the hypervisor that the migration module is complete. In response to the notification, the hypervisor disables I/O filtering and redirection.

Figure 5:
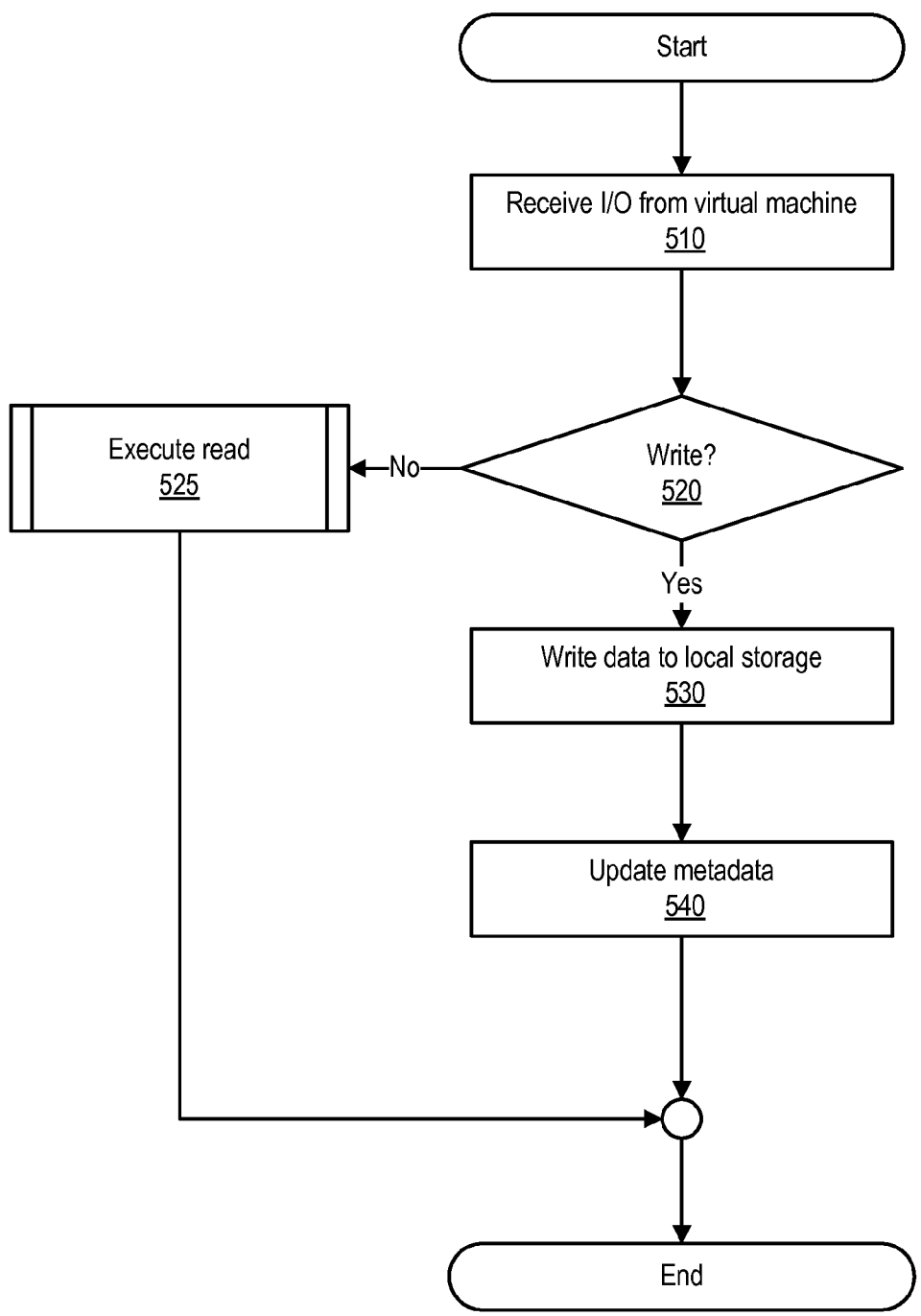
FIG. 5 is a flowchart of a method of performing I/O operations during restoration of a virtual disk, according to one embodiment.

FIG. 5 shows additional details of processing I/O operations during restoration of a virtual disk. The method can be performed by a hypervisor, such as hypervisor 130 of FIG. 1, a filter module, such as filter module 132 of FIG. 1, and a redirect module, such as redirect module 134 of FIG. 1.

At 510, the filter module detects a request to perform an I/O operation. The I/O operation can be, for example, a read operation or a write operation initiated. The request can be initiated by an application, such as application 122 of FIG. 1. In one embodiment, the application is implemented using a virtual machine, such as virtual machine 120 of FIG. 1, which has been restored from a backup image of the virtual machine. The I/O operation can specify one or more blocks of a virtual disk.

At 520, the filter module detects whether the I/O operation is a write operation or a read operation. If the I/O operation is a read operation, the filter module passes the I/O operation to the redirect module and the read is executed at 525, as described in greater detail with regard to FIG. 6.

If the I/O operation is a write, the hypervisor allows the write to proceed to local storage at 530. At 540, the hypervisor updates virtual machine metadata, such as virtual machine metadata 158 of FIG. 1, to indicate that the target block has been written. In one embodiment, the hypervisor also updates migration metadata, such as migration metadata 166 of FIG. 1, to indicate that the block has been written and the migration module should not restore data from a backup to the block.

Figure 6:
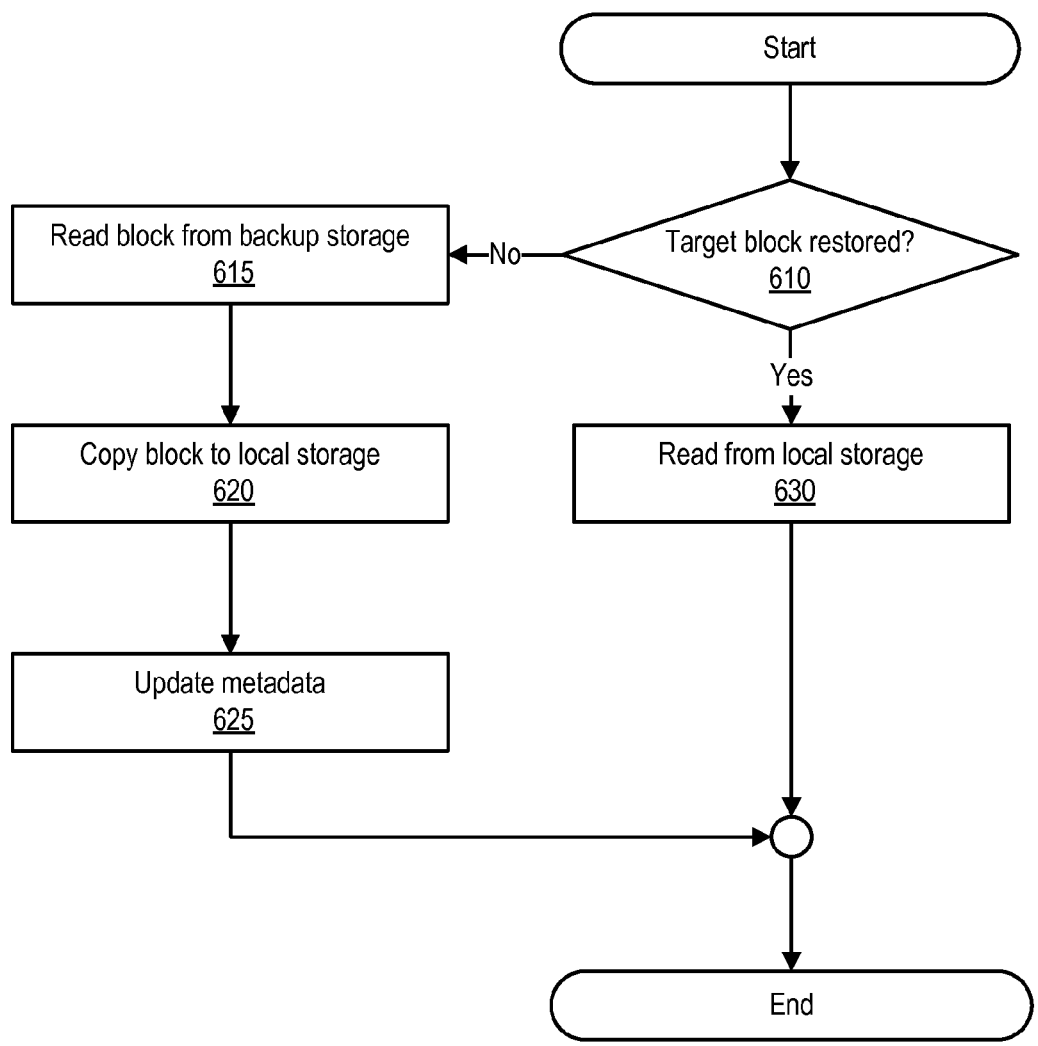
FIG. 6 is a flowchart showing additional details of a method of performing I/O operations during restoration of a virtual disk, according to one embodiment.

FIG. 6 shows additional details of executing a read operation during a virtual disk restore operation. The method can be performed by a hypervisor, such as hypervisor 130 in FIG. 1, a filter module, such as filter module 132 of FIG. 1, and a redirect module, such as redirect module 134 of FIG. 1.

At 610, the hypervisor detects whether or not the target block has already been restored from backup storage, such as backup storage device 170 of FIG. 1, to a local storage device, such as local storage device 150 of FIG. 1. In order to do so, the hypervisor can access virtual machine metadata, such as virtual machine metadata 158 in FIG. 1. If the hypervisor detects that the block has already been restored, the hypervisor reads the block at 630 from local storage and provides the target block to the virtual machine that requested the block.

If the hypervisor detects that the target block has not been already been restored, at 615 the hypervisor reads the target block from the backup storage device and provides the target block to the virtual machine that requested the block. The hypervisor can access backup metadata to determine the location of a backup copy of the target block. The target block can be stored in either a full backup image or in an incremental backup image in a backup storage device.

At 620, the hypervisor copies the block from the backup storage device to the local storage device. In one embodiment, the hypervisor instructs a migration module, such as migration module 164 in FIG. 1, to perform the copying of the block.

At 625, the migration module updates migration metadata, such as migration metadata 166 of FIG. 1, to indicate that the block has been restored from the backup storage device to the local storage device. The hypervisor also updates the virtual machine metadata to indicate that the virtual disk stores valid data at the target block.

Figure 7:
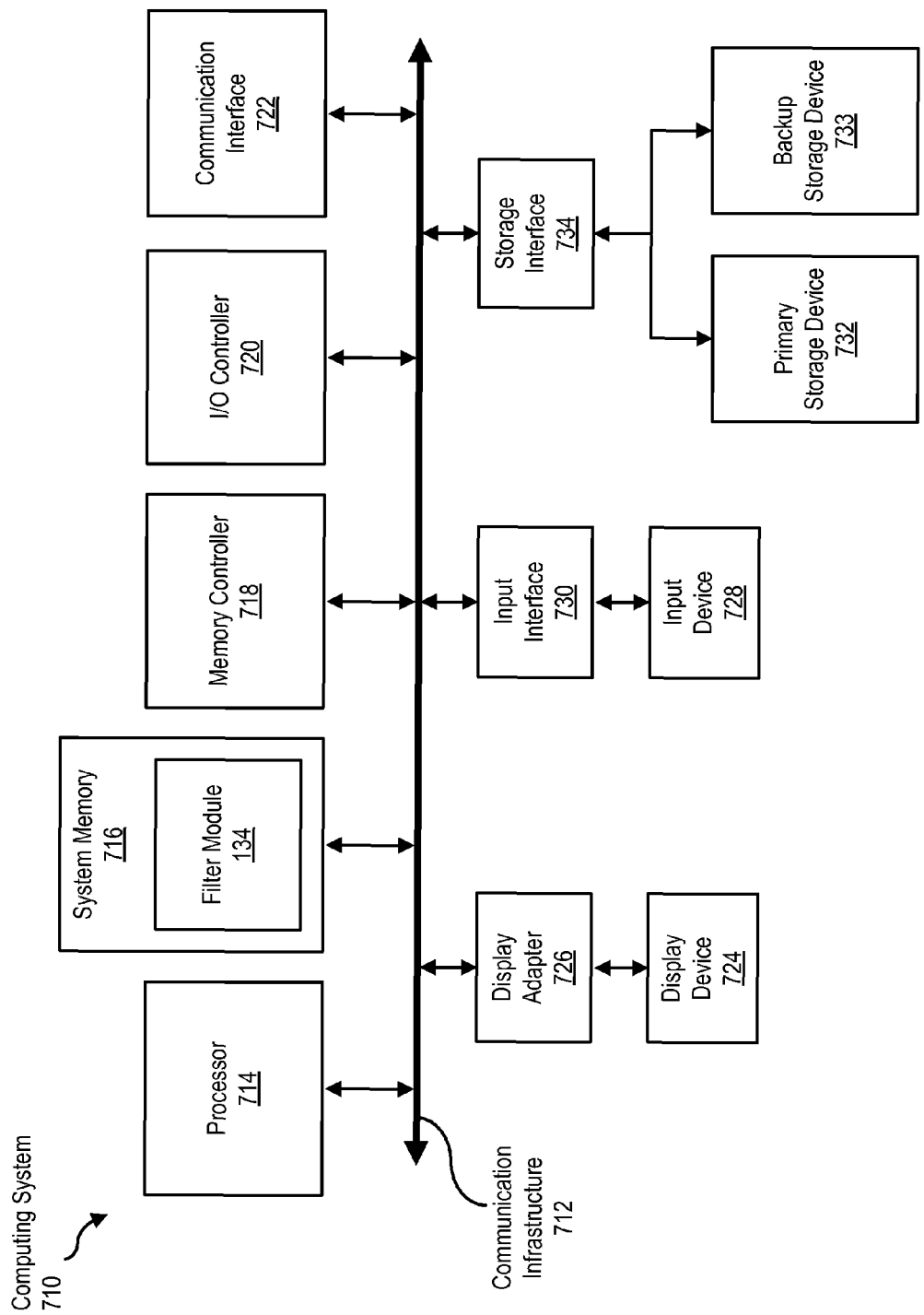
FIG. 7 is a block diagram of a computing device, illustrating how a filter module can be implemented in software, according to one embodiment.

FIG. 7 is a block diagram of a computing system 710, capable of performing I/O operations to a virtual disk in a local storage device, while the virtual disk is being restored from a backup storage device as described above. Computing system 710 broadly represents any single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 710 may include at least one processor 714 and a system memory 716. By executing the software that implements a filter module 134, computing system 710 becomes a special purpose computing device that is configured to perform I/O operations in the manner described above.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. For example, processor 714 may perform and/or be a means for performing the operations described herein. Processor 714 may also perform and/or be a means for performing any other operations, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, program instructions executable to implement a filter module (e.g., as shown in FIG. 1) may be loaded into system memory 716.

In certain embodiments, computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the operations or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 7100, and storage interface 7104.

Communication interface 722 broadly represents any type or form of communication device or adapter capable of facilitating communication between computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11074 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724.

As illustrated in FIG. 7, computing system 710 may also include at least one input device 728 coupled to communication infrastructure 712 via an input interface 730. Input device 728 generally represents any type or form of input device capable of providing input, either computer or human generated, to computing system 710. Examples of input device 728 include, without limitation, a keyboard, a pointing device, a speech recognition device, or any other input device.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. A storage device like primary storage device 732 can store information such as full backup images, incremental backup images, and/or backup metadata.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7.

Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 710 may be configured as an application specific integrated circuit (ASIC) adapted to implement one or more of the embodiments disclosed herein.

Figure 8:
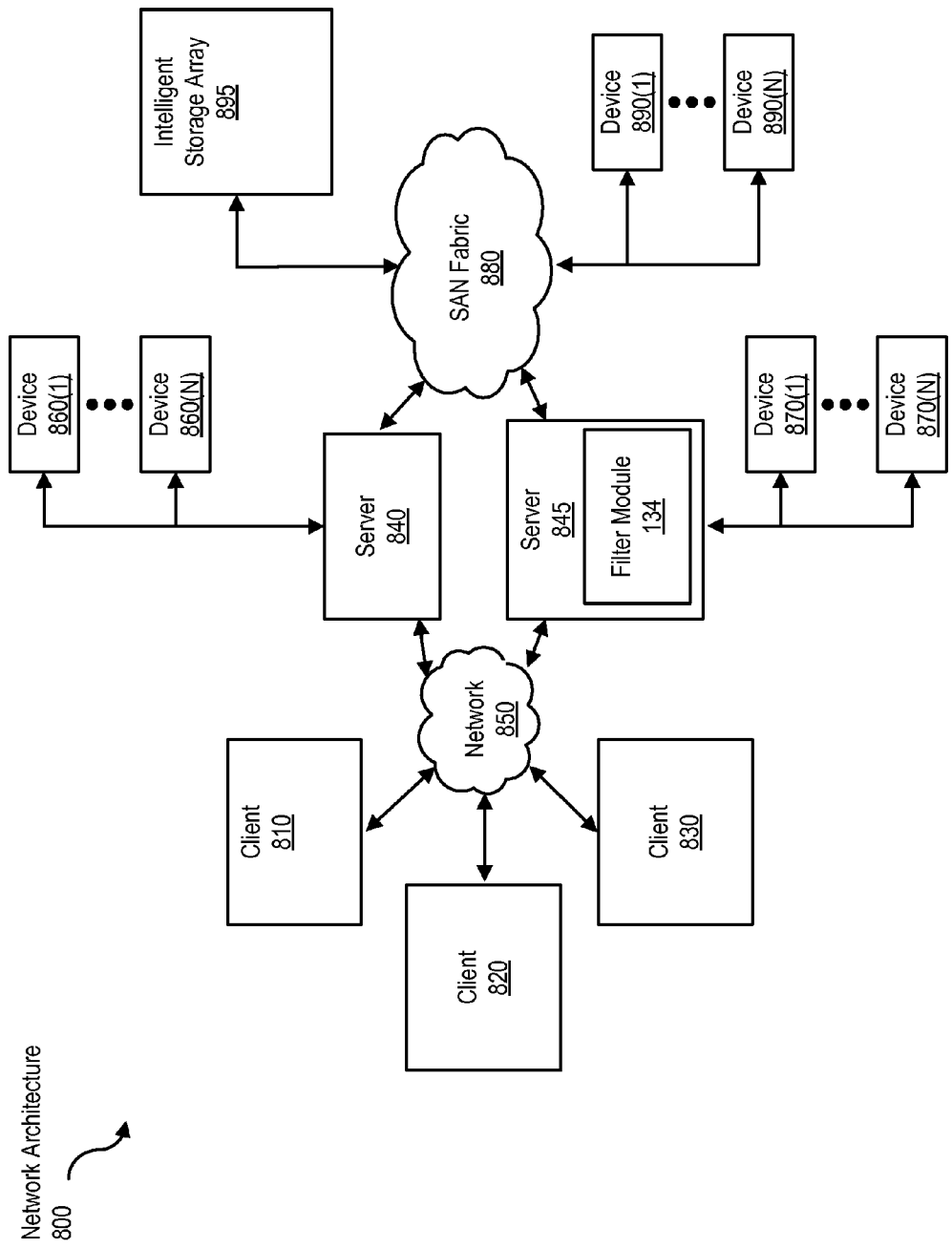
FIG. 8 is a block diagram of a networked system, illustrating how various computing devices can communicate via a network, according to one embodiment.

FIG. 8 is a block diagram of a network architecture 800 in which client systems 810, 820, and 830 and servers 840 and 845 may be coupled to a network 850. Client systems 810, 820, and 830 generally represent any type or form of computing device or system, such as computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, one or more of client systems 88, 820, and/or 830 may include a filter module 134 as shown in FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS). Such storage devices can store backup information and storage configuration information, as described above.

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 88, 820, and 830 and storage devices 890(1)-(N) and/or intelligent storage array 895 in such a manner that devices 890(1)-(N) and array 895 appear as locally attached devices to client systems 88, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 840(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of one of the systems in FIGS. 1, 7, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a filter module may transform the behavior of a virtualization system such that a virtual disk is created.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a restore request, wherein
      the restore request specifies a virtual machine and virtual machine data,
      the virtual machine data comprises at least a portion of a virtual disk associated with the virtual machine, and
      the virtual machine and virtual machine data are stored in at least one backup storage device;
   restoring the virtual machine from the at least one backup storage device to a local storage device, wherein
      the local storage device comprises at least one new virtual disk created for and assigned to the virtual machine;
   initiating restoration of the virtual machine data, wherein
      the restoration of the virtual machine data comprises copying at least a portion of the virtual machine data from the at least one backup storage device to the at least one new virtual disk on the local storage device;
   receiving a plurality of input/output (I/O) requests from the restored virtual machine; and
   performing the plurality of I/O requests received from the restored virtual machine, wherein
      the performing is performed prior to completing the restoration of the virtual machine data to the local storage device, and
      the performing comprises performing a first of the plurality of I/O requests to the at least one new virtual disk on the local storage device and
      performing a second of the plurality of I/O requests to the at least one backup storage device.

2. The method of claim 1, wherein the restoration of the virtual machine data comprises:
copying a first portion of the virtual machine data from a full backup stored in a first backup storage device of the at least one backup storage device; and
copying a second portion of the virtual machine data from at least one incremental backup, wherein
the at least one incremental backup is stored in at least one another backup storage device of the at least one backup storage device.

3. The method of claim 1, wherein
the plurality of I/O requests comprise a write request, wherein
the write request specifies a first data portion, and
performing the write request comprises writing the first data portion to the at least one new virtual disk on the local storage device instead of to the backup storage device.

4. The method of claim 1, wherein
the plurality of I/O requests comprise a read request, wherein
the read request specifies target data, and
performing the read request comprises copying the target data from the backup storage device to the at least one new virtual disk on the local storage device.

5. The method of claim 1, wherein
the performing comprises detecting whether a target block of a first I/O request has been written in the at least one new virtual disk on the local storage device and, if so, preventing the restoration of the virtual machine data from overwriting the target block.

6. The method of claim 1, wherein
the restoration of the virtual machine data comprises updating metadata to indicate which blocks have been restored to the at least one new virtual disk on the local storage device.

7. The method of claim 1, wherein
the restore request specifies a subset of the virtual machine data associated with the virtual machine stored in the at least one backup storage device.

8. The method of claim 1, further comprising:
detecting unavailability of the virtual machine on a host prior to receiving the restore request, wherein
the restore request specifies the virtual machine and virtual machine data to be restored to an another host.

9. The method of claim 8, further comprising:
determining whether each of the plurality of I/O requests can be performed to the at least one new virtual disk on the local storage device or to the at least one backup storage device, wherein
the local storage device is associated with the another host; and
inhibiting performance of an I/O request of the plurality of I/O requests to both the local storage device and the at least one backup storage device.

10. The method of claim 1, wherein the processing comprises:
intercepting the plurality of I/O requests, wherein
the plurality of I/O requests specify the at least one new virtual disk on the local storage device; and
selectively redirecting at least one of the plurality of I/O requests to the at least one backup storage device.

11. The method of claim 10, wherein
the intercepting and the selectively redirecting are performed by a filter driver, and
the filter driver is implemented in a hypervisor.

12. The method of claim 10, wherein
the intercepting is performed by a filter driver, and
the selectively redirecting is performed by a second virtual machine.

13. A non-transitory computer readable storage medium storing program instructions executable to:
receive a restore request, wherein
the restore request specifies a virtual machine and virtual machine data,
the virtual machine data comprises at least a portion of a virtual disk associated with the virtual machine, and
the virtual machine and virtual machine data are stored in at least one backup storage device;
restore the virtual machine from the at least one backup storage device to a local storage device, wherein
the local storage device comprises at least one new virtual disk created for and assigned to the virtual machine;
initiate restoration of the virtual machine data, wherein
the restoration of the virtual machine data comprises copying at least a portion of the virtual machine data from the at least one backup storage device to the at least one new virtual disk on the local storage device;
receive a plurality of input/output (I/O) requests from the restored virtual machine; and
perform the plurality of I/O requests received from the restored virtual machine, wherein
performing the plurality of I/O requests occurs prior to completing the restoration of the virtual machine data to the local storage device, and
the performing comprising performing a first of the plurality of I/O requests to the at least one new virtual disk on the local storage device and performing a second of the plurality of I/O requests to the at least one backup storage device.

14. The non-transitory computer readable storage medium of claim 13, wherein the instructions are further executable to:
copy a first portion of the virtual machine data from a full backup stored in a first backup storage device of the at least one backup storage device; and
copy a second portion of the virtual machine data from at least one incremental backup, wherein
the at least one incremental backup is stored in at least one another backup storage device of the at least one backup storage device.

15. The non-transitory computer readable storage medium of claim 13, wherein the instructions are further executable to:
intercept the plurality of I/O requests, wherein
the I/O requests specify the at least one new virtual disk on the local storage device; and
selectively redirect at least one of the plurality of I/O requests to the at least one backup storage device.

16. The non-transitory computer readable storage medium of claim 13, wherein
the plurality of I/O requests comprise a write request, wherein
the write request specifies a first data portion, and
performing the write request comprises writing the first data portion to the at least one new virtual disk on the local storage device instead of to the backup storage device.

17. The non-transitory computer readable storage medium of claim 13, wherein
- the plurality of I/O requests comprise a read request, wherein
  - the read request specifies target data, and
- performing the read request comprises copying the target data from the backup storage device to the at least one new virtual disk on the local storage device.

18. A system comprising:
- one or more processors; and
- a memory coupled to the one or more processors, wherein the memory stores program instructions executable by the one or more processors to:
- receive a restore request, wherein
  - the restore request specifies a virtual machine and virtual machine data,
  - the virtual machine data comprises at least a portion of a virtual disk associated with the virtual machine, and
  - the virtual machine and virtual machine data are stored in at least one backup storage device;
- restore the virtual machine from the at least one backup storage device to a local storage device, wherein
  - the local storage device comprises at least one new virtual disk created for and assigned to the virtual machine;
- initiate restoration of the virtual machine data, wherein
  - the restoration of the virtual machine data comprises copying at least a portion of the virtual machine data from the at least one backup storage device to the at least one new virtual disk on the local storage device;
- receive a plurality of input/output (I/O) requests from the restored virtual machine; and
- perform the plurality of I/O requests received from the restored virtual machine, wherein
  - performing the plurality of I/O requests occurs prior to completing the restoration of the virtual machine data to the local storage device, and
  - the performing comprising performing a first of the plurality of I/O requests to the at least one new virtual disk on the local storage device and performing a second of the plurality of I/O requests to the at least one backup storage device.

19. The system of claim 18, wherein the instructions are further executable to:
- copy a first portion of the virtual machine data from a full backup stored in a first backup storage device of the at least one backup storage device; and
- copy a second portion of the virtual machine data from at least one incremental backup, wherein
  - the at least one incremental backup is stored in at least one another backup storage device of the at least one backup storage device.

20. The system of claim 18, wherein the instructions are further executable to:
- intercept the plurality of I/O requests, wherein
  - the I/O requests specify the at least one new virtual disk on the local storage device; and
- selectively redirect at least one of the plurality of I/O requests to the at least one backup storage device.

21. The system of claim 18, wherein
- the plurality of I/O requests comprise a write request, wherein
  - the write request specifies a first data portion, and
- performing the write request comprises writing the first data portion to the at least one new virtual disk on the local storage device instead of to the backup storage device.

22. The system of claim 18, wherein
- the plurality of I/O requests comprise a read request, wherein
  - the read request specifies target data, and
- performing the read request comprises copying the target data from the backup storage device to the at least one new virtual disk on the local storage device.

* * * * *